United States Patent
Park et al.

(10) Patent No.: US 11,792,049 B2
(45) Date of Patent: Oct. 17, 2023

(54) POSITIONING USING SYNTHESIZED WIDEBAND CHANNEL ESTIMATION AND SYNCHRONIZED RECEIVERS

(71) Applicant: PhasorLab, Inc., Billerica, MA (US)

(72) Inventors: Joshua C. Park, Billerica, MA (US); Paul Christopher McFarthing, Boston, MA (US); Jian Cui, Waltham, MA (US)

(73) Assignee: PhasorLab, Inc., Billerica, MA (US)

(*) Notice: Subject to any disclaimer, the term of this patent is extended or adjusted under 35 U.S.C. 154(b) by 0 days.

(21) Appl. No.: 17/695,819

(22) Filed: Mar. 15, 2022

(65) Prior Publication Data

US 2022/0294669 A1 Sep. 15, 2022

Related U.S. Application Data

(60) Provisional application No. 63/161,343, filed on Mar. 15, 2021.

(51) Int. Cl.
| | |
|---|---|
| *H04L 25/02* | (2006.01) |
| *H04W 4/029* | (2018.01) |
| *H04L 5/00* | (2006.01) |

(52) U.S. Cl.
CPC ........ *H04L 25/0224* (2013.01); *H04L 5/0048* (2013.01); *H04L 25/0242* (2013.01); *H04W 4/029* (2018.02)

(58) Field of Classification Search
CPC .............. H04L 25/0224; H04L 5/0048; H04L 25/0242; H04L 5/001; H04L 5/0016; H04L 5/003; H04L 25/0204; H04L 25/0216; H04L 25/0232; H04W 4/029
See application file for complete search history.

(56) References Cited

U.S. PATENT DOCUMENTS

| | | | |
|---|---|---|---|
| 8,345,799 B2 * | 1/2013 | Akahori | H04L 25/03159 375/139 |
| 10,361,887 B2 * | 7/2019 | Bhatti | H04L 25/0204 |
| 2014/0105256 A1 | 4/2014 | Hanevich et al. | |

OTHER PUBLICATIONS

Decawave (now part of Qorvo), "Decawave Announces New, Low Price Module Targeting TDoA Tag Applications", Jul. 24, 2019, https://www.decawave.com/decawave-announces-dwm1004module/, Accessed May 18, 2023.

(Continued)

*Primary Examiner* — Kabir A Timory
(74) *Attorney, Agent, or Firm* — Michael Y. Saji

(57) ABSTRACT

A method of positioning using a shortest path based on a synthesized wideband channel estimate is described. In some embodiments, a method is disclosed, comprising: distributing an uplink schedule to a plurality of synchronized nodes; continuously capturing a reference signal across a plurality of carrier frequencies until frequency coverage for the synthetic wide band is achieved; removing frequency offset; calculating a plurality of channel estimates for the captured reference signal; aligning the plurality of channel estimates; combining the plurality of channel estimates to construct a single channel estimate of the synthetic wide band; deriving a shortest delay for the received reference signal; and using the derived shortest delay to estimate a time of arrival and thereby determine an estimated location.

17 Claims, 7 Drawing Sheets

(56) References Cited

OTHER PUBLICATIONS

Kempke et al.: "Harmonium: Asymmetric, Bandstitched UWB for Fast, Accurate, and Robust Indoor Localization," 2016 15th ACM/IEEE International Conference on Information Processing in Sensor Networks (IPSN), Vienna, Austria, 2016, pp. 1-12, doi: 10.1109/IPSN.2016.7460675.

Sathyan et al.: "WASP: A System and Algorithms for Accurate Radio Localization Using Low-Cost Hardware," in IEEE Transactions on Systems, Man, and Cybernetics, Part C (Applications and Reviews), vol. 41, No. 2, pp. 211-222, Mar. 2011, doi: 10.1109/TSMCC.2010.2051027.

Hua et al.: "Matrix pencil method and its performance", ICASSP-88., International Conference on Acoustics, Speech, and Signal Processing, New York, Ny, USA, 1988, pp. 2476-2479 vol.4, doi: 10.1109/ICASSP.1988.197145.

Bayat et al.: "Joint TOA/DOA wireless position location using matrix pencil," IEEE 60th Vehicular Technology Conference, 2004. VTC2004-Fall. 2004, Los Angeles, Ca, USA, 2004, pp. 3535-3539 Vol. 5, doi: 10.1109/ VETECF.2004.1404722.

Labib et al.: "Location determination using Time Delay Matrix Pencil method with Grey Relational Analysis," 2008 National Radio Science Conference, Tanta, Egypt, 2008, pp. 1-8, doi: 10.1109/NRSC.2008.4542346.

Ding et al.: "TOA Estimation for IR-UWB System Using Matrix Pencil," 2009 WRI World Congress on Computer Science and Information Engineering, Los Angeles, Ca, USA, 2009, pp. 461-464, doi: 10.1109/CSIE.2009.283.

Gaber et al.: "Joint time delay and DOA estimation using 2-D matrix pencil algorithms and IEEE 802.11ac," 2013 10th Workshop on Positioning, Navigation and Communication (WPNC), Dresden, Germany, 2013, pp. 1-6, doi: 10.1109/ WPNC.2013.6533270.

Mirbeik et al.: "Synthetic ultra-wideband antenna for high-resolution millimeter-wave imaging", 2015 IEEE International Symposium on Antennas and Propagation & USNC/URSI National Radio Science Meeting, Jul. 19-24, 2015, Doi 10.1109/APS.2015.7305436.

Mirbeik-Sabzevari et al.: "Synthetic ultra-wideband integrated pulse generator for millimeter-wave imaging applications," 2020 18th IEEE International New Circuits and Systems Conference (NEWCAS), Jun. 16-19, 2020, Doi 10.1109/NEWCAS49341.2020.9159763.

Assiimwe et al.: "A Matrix Pencil Method For the Efficient Computation of Direction of Arrival Estimation for Weakly Correlated Signals Using Uniform Linear Array in a Low SNR Regime," International Journal of Engineering Research and Technology ISSN 0974-3154 vol. 11, No. 9 (2018), pp. 1347-1361.

Luan, D., "Fundamental Performance Limits on Time of Arrival Estimation Accuracy with 5G Radio Access", Dissertation, 2017.

\* cited by examiner

POSITIONING USING SYNTHESIZED WIDEBAND CHANNEL ESTIMATION AND SYNCHRONIZED RECEIVERS

CROSS-REFERENCE TO RELATED APPLICATIONS

The present application claims the benefit of priority under 35 U.S.C. § 119(e) to U.S. Provisional App. No. 63/161,343, filed Mar. 15, 2021 and entitled "Wireless Time and Positioning Using Synthesized Wideband Channel Estimation and Synchronized Receivers," which is hereby incorporated by reference in its entirety for all purposes. In addition, the following references are hereby incorporated by reference in their entirety for all purposes: U.S. Pat. Pub. No. US20180206075A1, "High-Resolution High-Dynamic Range Doppler-Effect-Measurement Using Modulated Carrier Signals"; U.S. Pat. Pub. No. US20180146443A1, "Wireless Time and Frequency Lock Loop System"; U.S. Pat. Pub. No. US20170227623A1, "Angle of Arrival Measurements Using RF Carrier Synchronization and Phase Alignment Methods"; U.S. Pat. No. 10,944,496, "Time-Domain and Frequency-Domain Approach to Frequency Offset Correction Method for LTE SC-FDMA Uplink"; U.S. Pat. No. 9,048,980, "RF Carrier Synchronization and Phase Alignment Methods and Systems"; and U.S. Pat. No. 9,048,979, "RF Carrier Synchronization and Phase Alignment Methods and Systems."

Also incorporated by reference in their entirety are each of the following references, which are also referred to within the body of this disclosure: H. Urkowitz, "Signal Theory and Random Processes", Dedham, Mass. Artech House, 1983; Decawave (now part of Qorvo), "Decawave Announces New, Low Price Module Targeting TDoA Tag Applications", Jul. 24, 2019, https://www.decawave.com/decawave-announces-dwm1004module/, Accessed Mar. 12, 2021; Hanevich, et al. "Band stitching electronic circuits and techniques" Aug. 12, 2014, U.S. Pat. No. 8,805,297; B. Kempke, P. Pannuto and P. Dutta, "Harmonium: Asymmetric, Band-stitched UWB for Fast, Accurate, and Robust Indoor Localization," 2016 15th ACM/IEEE International Conference on Information Processing in Sensor Networks (IPSN), Vienna, Austria, 2016, pp. 1-12, doi: 10.1109/IPSN.2016.7460675; T. Sathyan, D. Humphrey and M. Hedley, "WASP: A System and Algorithms for Accurate Radio Localization Using Low-Cost Hardware," in IEEE Transactions on Systems, Man, and Cybernetics, Part C (Applications and Reviews), vol. 41, no. 2, pp. 211-222, March 2011, doi: 10.1109/TSMCC.2010.2051027; Y. Hua and T. K. Sarkar, 'Matrix pencil method and its performance', ICASSP-88., International Conference on Acoustics, Speech, and Signal Processing, New York, N.Y., USA, 1988, pp. 2476-2479 vol. 4, doi: 10.1109/ICASSP.1988.197145; K. Bayat and R. S. Adve, "Joint TOA/DOA wireless position location using matrix pencil," IEEE 60th Vehicular Technology Conference, 2004. VTC2004-Fall. 2004, Los Angeles, Calif., USA, 2004, pp. 3535-3539 Vol. 5, doi: 10.1109/VETECF.2004.1404722; M. A. Labib and H. M. Elkamchouchi, "Location determination using Time Delay Matrix Pencil method with Grey Relational Analysis," 2008 National Radio Science Conference, Tanta, Egypt, 2008, pp. 1-8, doi: 10.1109/NRSC.2008.4542346; R. Ding, Z. Qian and H. Jiang, "TOA Estimation for IR-UWB System Using Matrix Pencil," 2009 WRI World Congress on Computer Science and Information Engineering, Los Angeles, Calif., USA, 2009, pp. 461-464, doi: 10.1109/CSIE.2009.283; and A. Gaber and A. Omar, "Joint time delay and DOA estimation using 2-D matrix pencil algorithms and IEEE 802.11ac," 2013 10th Workshop on Positioning, Navigation and Communication (WPNC), Dresden, Germany, 2013, pp. 1-6, doi: 10.1109/WPNC.2013.6533270.

BACKGROUND

The accuracy of ranging estimation utilizing Radio Frequency (RF) signals has a strong correlation with the RF signal bandwidth being used. This explains the popular adoption of Ultra-Wide Band (UWB) signals with typically 1 GHz bandwidth or more when accurate ranging estimation is the main goal for such applications as in UWB radars. However, UWB is not a readily available option for typical wireless communication applications such as Wi-Fi or Cellular, which typically only provide tens of MHz of signal bandwidth per user.

It is highly desirable in many applications to acquire as accurate a position as possible, such as navigation or for emergency first responders. In some environments, notably indoors or underground, GPS cannot be relied upon to provide location data, and even outdoors, some form of enhanced GPS, such as differential or real-time kinematic is required to achieve sub-meter positioning which is not always feasible. The accuracy of radio-based localization is proportional to the signal bandwidth [Urkowitz, 1983]. Indoors, especially, the presence of multi-path is a key limiting factor. Increasing the signal frequency range leads to a better resolution of multi-path in a channel; according to the Nyquist sampling theorem a 1 GHz sampling rate is required to resolve 30 cm objects.

One of the popular wireless technologies for providing high accuracy are devices employing impulse-radio ultra-wideband (IR-UWB), [Decawave, 2019]. IR-UWB uses trains of short duration pulses to estimate the wireless channel environment and so derive the delay corresponding to the path between the transmitter and receiver. Such UWB radios are not used for high data rate communication however, due to the complexity and cost of such a device, and currently wireless communications at a consumer level typically use cellular or Wi-Fi protocols, with much narrower signal bandwidths.

The idea of combining narrower frequency bands to reap the benefits afforded by a wide frequency range has been explored previously [Hanevich, 2014] and applied to positioning [Sathyan, 2011], [Kempke, 2016]. There are two kinds of band-stitching systems. First, the transmitter is wideband and there are multiple narrowband receivers. Each narrow band receiver captures part of the wideband signal, and then these narrowband signals are stitched together to form the original wideband signal. Second, both Tx and Rx are narrowband, and both must be synchronized for effective band-stitching. This is a major challenge for the stitching system and a source of major degradation of positioning system performance as mentioned in [Sathyan, 2011].

MP [Hua, 1988] and other super-resolution processing techniques attempt to mitigate the limitation of bandwidth through using a model of the channel complexity. For example, MP takes as an input a parameter that enumerates the number of paths required to model the channel. Both increasing the effective channel bandwidth through combining narrowband adjacent channel estimates and then using MP provide performance improvements beyond either approach alone; when TOA (time of arrival) measurements are made with a series of well synchronized devices (1ns of timing error equates to 30 cm distance error), differences between these arrival times, Time Difference of Arrival (TDOA), combined with positions of the receiver nodes can be used to derive the position of the transmitter, using various techniques such as Gauss-Newton gradient descent. [Bayat 2004, Labib 2008, Ding 2009, Gaber 2013].

SUMMARY

Presented in this disclosure are ways of effectively creating (or "synthesizing") much wider RF signals (or channel estimates) than the actual equipped transmitters are transmitting in order to enhance ranging estimation accuracy. We accomplish this task, in some embodiments, by utilizing our highly time-synchronized wireless network, which we call Hyper Sync Net (HSN), in order to create a synchronized channel hopping sequence, which allows us to coherently stitch together RF signals received at different times and with different carrier frequencies. We also utilize super-resolution channel estimation techniques, such as the Matrix Pencil (MP) algorithm in combination with this "synthesized" wide-band signals (or channel estimations) in order to estimate the channel delay. The resulting outcome is the time-of-arrival (TOA) estimation of the signal at the receiver with much greater accuracy than can be achieved with just the signal bandwidth allocated for given applications, including to the level of decimeter or even centimeter positioning for a standard cell phone or Wi-Fi UE given an optimal environment.

In a first embodiment, a method is disclosed for positioning using synthesized wideband channel estimation, comprising: capturing, at at least one receiver node, a first received signal of a reference signal from a transmitter at a first carrier frequency; performing a reconfiguration to enable signal reception at a second carrier frequency; capturing a second received signal of the reference signal from the transmitter at the second carrier frequency; continuing to capture subsequent received signals until a plurality of frequencies in a synthetic wideband channel may be sufficiently represented in a set of received signals; calculating segment channel estimates by performing channel estimation on each of the set of received signals; aligning overlapping sections of the calculated segment channel estimates to form a combined channel estimate of the synthetic wideband channel; deriving a shortest path delay value from a plurality of delays based on the combined channel estimate; deriving a time of arrival for the first received signal from the shortest path delay value; and estimating a position of the transmitter using the derived time of arrival, thereby using a channel estimate of a synthesized wideband channel to estimate the position of the transmitter.

The reference signal may be an arbitrary signal. The reference signal may be one of a Long Term Evolution (LTE) or 5G sounding reference signal (SRS). The method may further comprise distributing a uplink schedule to at least one receiver node. The method may further comprise distributing a synchronized channel hopping sequence to a plurality of synchronized receivers; and, capturing a plurality of signals according to the synchronized channel hopping sequence. The method may further comprise: capturing the reference signal at a plurality of synchronized receiver nodes; and, estimating the position of the transmitter at each of the plurality of synchronized receiver nodes. The method may further comprise estimating the position of the transmitter at each of a plurality of synchronized receiver nodes; and, using the estimated position from the plurality of synchronized receiver nodes to increase positional accuracy. The method may further comprise removing at least one of carrier frequency offset and sampling frequency offset from a received reference signal at the at least one receiver node. The method may further comprise calculating the channel estimate with a frequency domain signal. The method may further comprise aligning overlapping sections subsequent to a transform from time domain into frequency domain. The method may further comprise aligning overlapping sections of the calculated channel estimates by adding or subtracting a phase from each channel estimate of the calculated channel estimates, thereby forming a continuous channel response when combined. The method may further comprise interpolating gaps in the calculated channel estimates. wherein deriving a plurality of delays may be performed using a matrix pencil algorithm. The combined channel estimate may be continuous in phase.

In a second embodiment, a method is disclosed of positioning using a shortest path based on a synthesized wideband channel estimate, comprising: continuously capturing a reference signal across a plurality of carrier frequencies until frequency coverage for the synthetic wide band may be achieved; removing frequency offset for each of the plurality of carrier frequency captures; calculating a plurality of channel estimates for the plurality of carrier frequency captures; aligning the plurality of channel estimates; combining the plurality of channel estimates to construct a single channel estimate of the synthetic wide band; deriving a shortest delay for the received reference signal using the single channel estimate of the synthetic wide band; and using the derived shortest delay to estimate a time of arrival and thereby determine an estimated location. The method may further comprise distributing an uplink schedule to a plurality of synchronized nodes. Continuously capturing the reference signal may comprise repeatedly capturing the reference signal.

Various steps as described in the figures and specification may be added or removed from the processes described herein, and the steps described may be performed in an alternative order, consistent with the spirit of the invention. Features of one embodiment may be used in another embodiment. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

When this synthesized wide-band concept is deployed network-side with high degree of time and frequency synchronization (by means of our HSN, for example), one or a plurality of synchronized receivers can record this TOA with much greater accuracy for the transmitted signal from a target user equipment (UE) such as a cellphone, or a Wi-Fi device. The position of the target can be estimated with much greater degree of accuracy utilizing this synthesized wide-band (or Synthetic UWB, S-UWB) technique benefiting from the effect of wide-band RF signals without having to rely on actual UWB radios in order to create actual ultra-wide band (UWB) signals.

PhasorLab has demonstrated sub-nanosecond synchronization in its frequency agile Hyper-Synchronized Network (HSN) enabling the acquisition of channel estimates from Wi-Fi and cellular signal sources which can be stitched and processed using MP to provide decimeter level indoor positioning. The method for this process, particularly for a cellular context is outlined below.

Method

Figure 1:
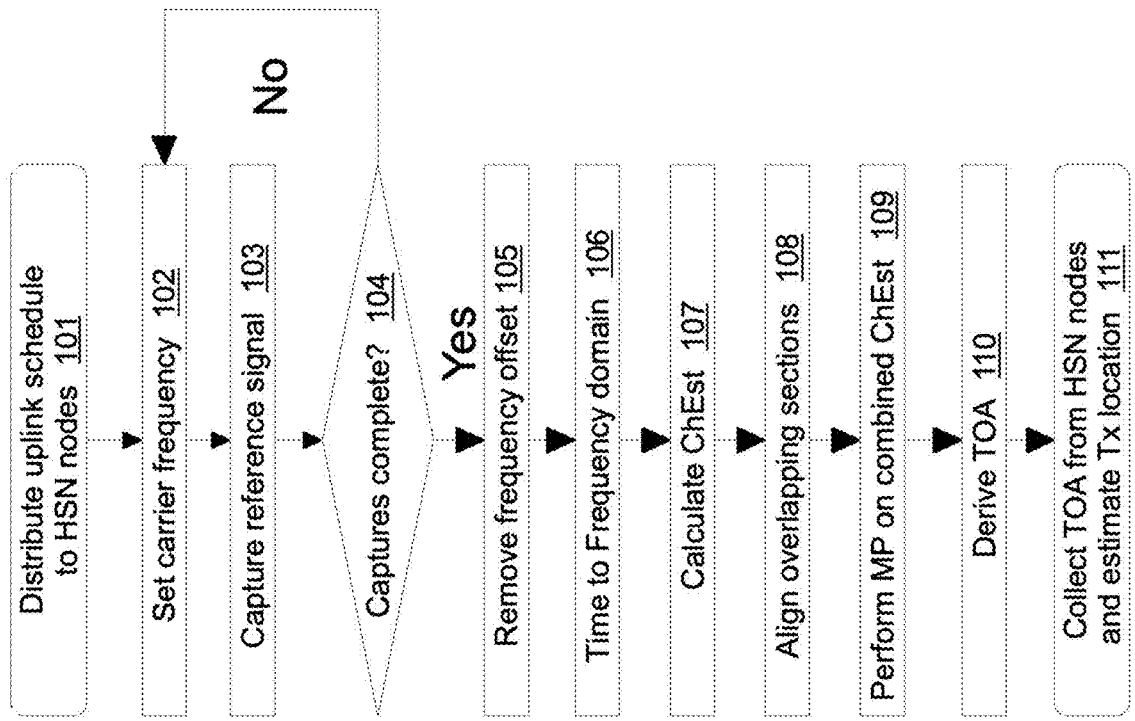
FIG. 1 is a flowchart showing synthesized wideband channel estimation, in accordance with some embodiments.

FIG. 1 is a flowchart showing synthesized wideband channel estimation, in accordance with some embodiments. The flowchart shows a method for synthesizing wide-band channel estimate and deriving TOA. Unless otherwise specified, these steps are taking place at a 101. Synchronized listening nodes, for example, Hyper-SyncNet (HSN) nodes, receive the schedule informing them when to listen for reference signal transmissions from mobile users (UE). One or more nodes could be involved. When multiple nodes are involved, HSN is capable of sub-nanosecond time sync and better than 1 ppb carrier frequency sync.

102. The synchronization network may operate on a different frequency to the cellular network, so a frequency hop may be necessary to listen to cellular traffic. In an LTE uplink scenario, for example, no additional carrier frequency hopping may be necessary as users share the band through use of the resource grid schedule, whereby Fourier coefficients, or resource elements, are dedicated to a particular user at a particular time. In an ad-hoc radio network, such as HSN from PhasorLab, both Tx and Rx may frequency hop synchronously in order to extend the total bandwidth.

103. Capture the baseband quadrature signals at the times corresponding to transmissions from target devices.

104. Continue to capture until the desired frequency range is covered. In the example schedule given in FIG. 1, five channel segments would be required to cover the entire frequency range of the resource grid. Coverage may be determined by the number and density of samples required to produce a channel estimate, for the individual channel segment, the synthetic wideband channel, or both that is accurate and useful to the degree that would be understood by one having skill in the art.

105. Prior to conversion to the frequency domain, using a Fast-Fourier Transform or similar, perform frequency offset corrections, as necessary. Frequency offset correction, as well as a highly synchronized transmitter, help enhance the effectiveness of this technique. As well, good synchronization avoids the issue of channel offset drift for multiple transmissions when aligning multiple segments.

106. It is assumed that the transmitted signal can be separated into different users in the frequency domain, as in OFDMA.

107. Divide the received IQ signal by the transmitted signal to calculate the channel estimate (ChEst).

Figure 3:
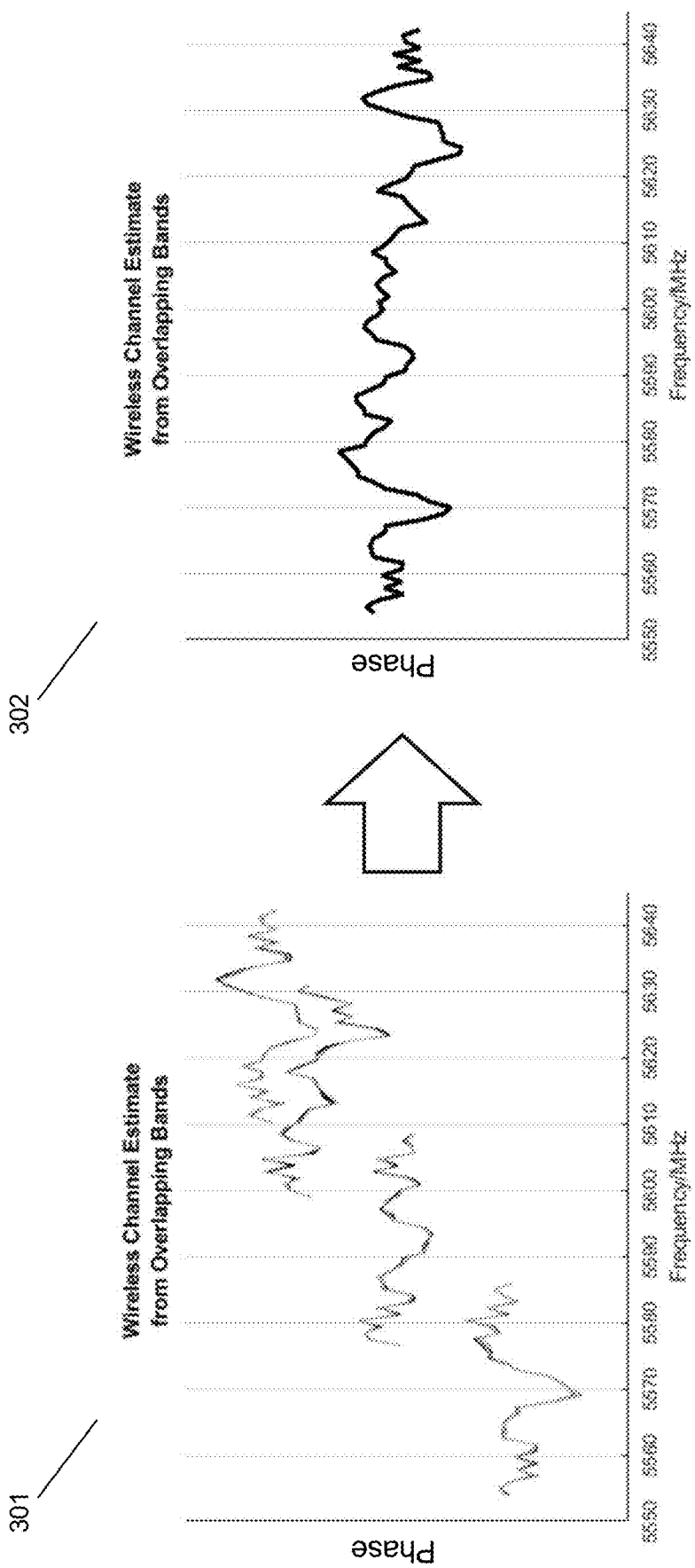
FIG. 3 is a schematic diagram of a synthetic wireless channel estimate constructed by overlapping multiple bands, in accordance with some embodiments.

108. To align the various segments of the channel estimate, a phase will need to be subtracted from each successive section. This phase can be estimated by taking the mean average of the phase difference in overlapping regions. If there are any gaps in the channel estimate, these can be filled using interpolation. The combination of overlapping channel estimates by adding or subtracting a random phase to align the channel segments to generate a single contiguous channel estimate is illustrated in FIG. 3.

109. Operating the Matrix Pencil algorithm on the combined channel estimate will return a series of eigenvalues whose phase is proportional to the delay of the channel. An estimate of the channel complexity is required and will be determined based on number of elements of the combined channel estimate and the nature of the wireless channel environment. The more multi-path, the higher this value. Attribute the smallest delay to the shortest path between transmitter and HSN node.

110. Combine this delay value with other timing information derived from the first segment capture timestamp for example and any device specific delay to generate a single TOA value per user (transmitter).

111. By comparing the TOA values, TDOA positioning can be used to estimate the user location. A gradient descent algorithm combined with positioning filter can be used to calculate these positions and track users.

Figure 2:
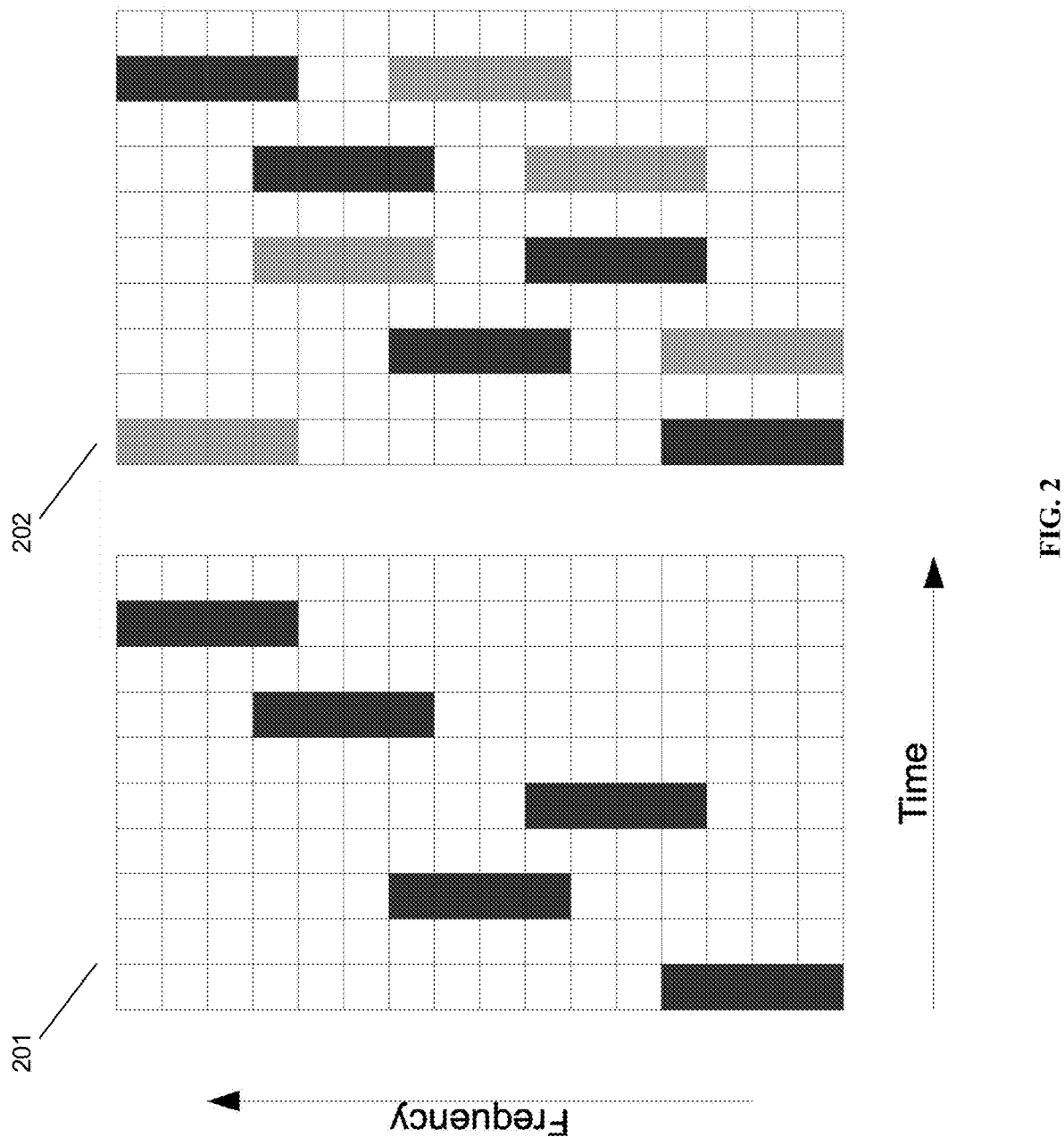
FIG. 2 is a schematic diagram of frequency resources across time for a single user and for two users, in accordance with some embodiments.

FIG. 2 is a schematic diagram of frequency resources across time for a single user and for two users, in accordance with some embodiments. 201 is an example of an uplink schedule for a single user, whose transmissions overlap in frequency but are spaced over time allowing the channel for the whole band to be estimated. 202 shows how multiple users can be supported by interleaving transmissions. One user is represented in black, while another user is represented in gray; the diagram is exemplary but additional users beyond two users may be supported by spreading out the received transmissions from those users over time.

FIG. 3 is a schematic diagram of a synthetic wireless channel estimate constructed by overlapping multiple channel estimates, in accordance with some embodiments. In chart 301, frequency response curves from separately received signals are graphed, showing that the wireless channel estimates from overlapping bands are highly correlated. For example, the frequency response curves for the 5555-5585 MHz frequency bands are nearly identical, even though estimated from separate received signals. The frequency response curve for 5620-5630 MHz are also highly correlated but have different phase, because estimated from separate received signals. Chart 302 shows the result of creating a single channel estimate from overlapping bands. The phase plot, which was previously discontinuous, has been normalized to be continuous, and the channel estimate effectively provides estimation of frequency response across the entirety of the 5555-5645 MHz band, i.e., approximately 100 MHz.

To give an example of the overlap and sub-carrier numbering that may be used in band-stitching, consider an orthogonal frequency division multiplexed (OFDM) signal such as Wi-Fi, 802.11a. The signal bandwidth of 20 MHz is divided into 64 sub-carriers, of which the central 52 are used except for the central or DC sub-carrier. If only the central sub-carriers are considered, these could be considered 1 through 53 from low to high frequency in Channel 1 with the DC sub-carrier occupying position 27. Channel 2 is 37 sub-carriers higher in frequency than Channel 1, such that 16 sub-carriers overlap (5 MHz). Continuing this pattern, if 16 similarly spaced channels are combined, a channel with a total of 608 sub-carriers or 190 MHz wide is generated, as shown below in FIG. 4. The channel corresponding to the unoccupied DC sub-carriers in each of the 16 channels can be estimated through interpolation of the neighboring occupied sub-carriers.

Figure 4:
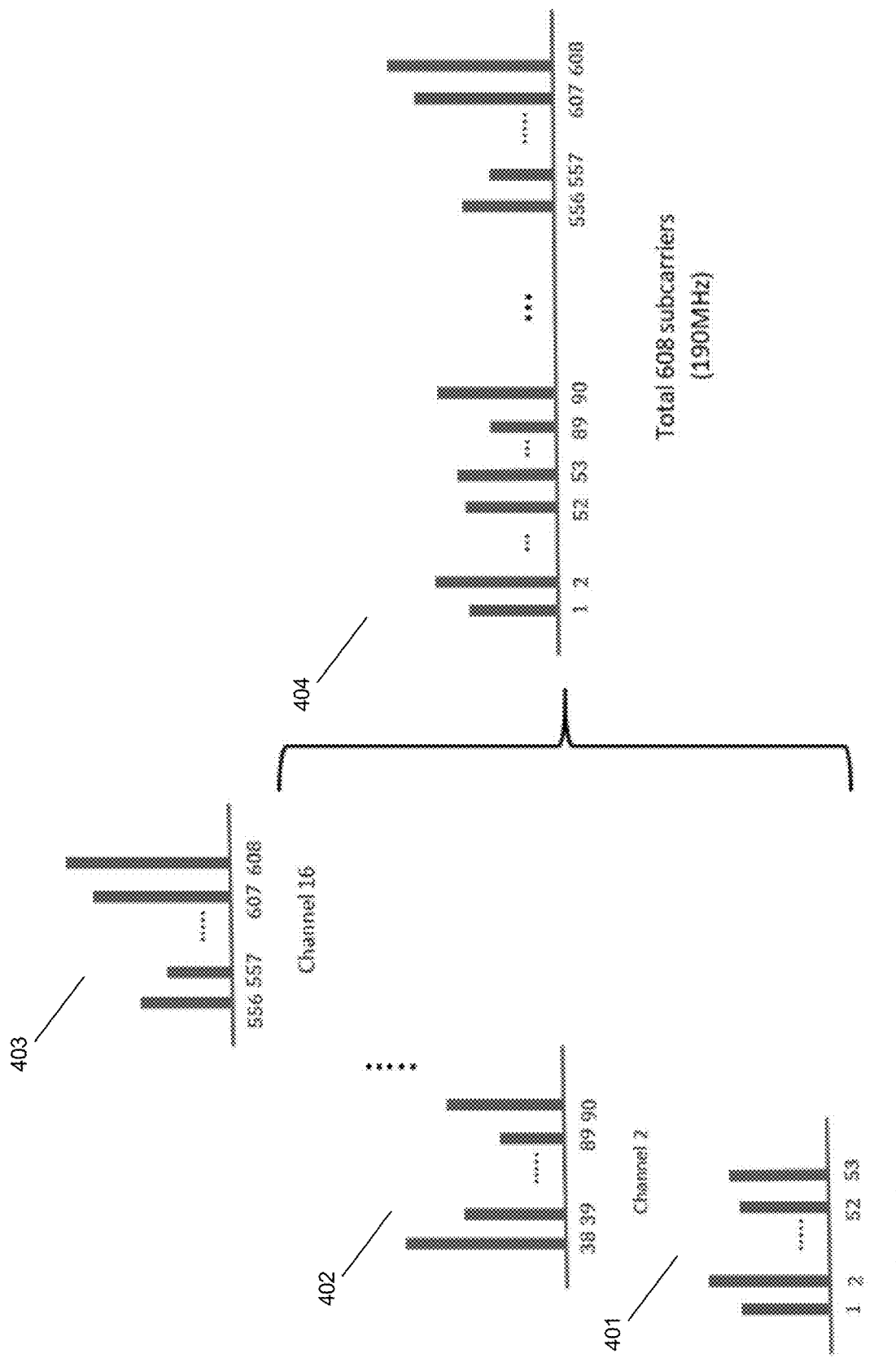
FIG. 4 is a schematic diagram of subcarriers in a synthesized wideband channel used for channel estimation, in accordance with some embodiments.

FIG. 4 is a schematic diagram of subcarriers in a synthesized wideband channel used for channel estimation, in accordance with some embodiments. FIG. 4 is an example of band-stitching showing how 16 channels with 53 sub-carriers in each could be combined, in some embodiments.

Figure 5:
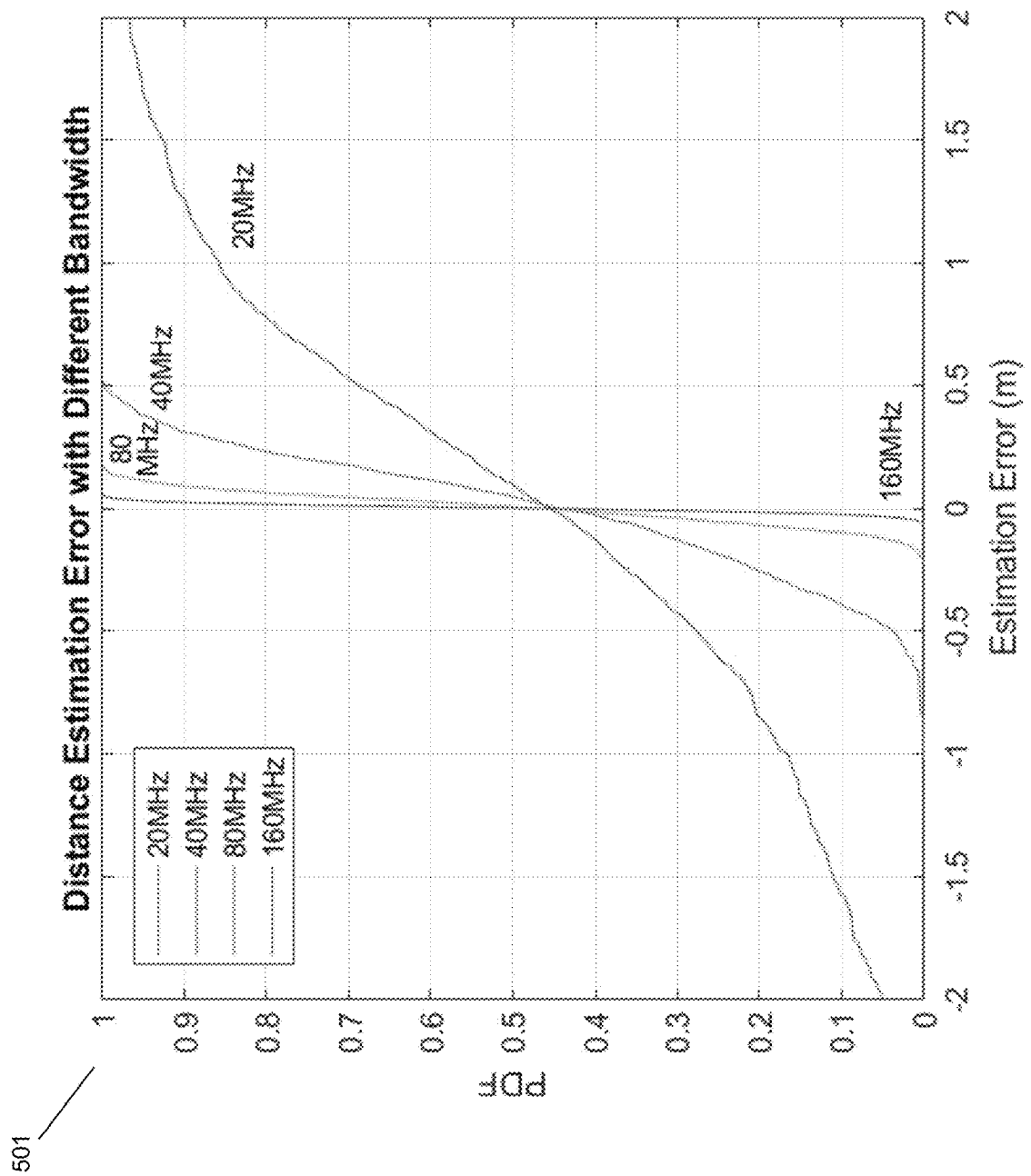
FIG. 5 is a distance estimation error plot using different bandwidths, in accordance with some embodiments.

FIG. 5 is a distance estimation error plot using different bandwidths, in accordance with some embodiments. Simulated MP performance over increasing bandwidth is shown in a two equal power path environment, in accordance with some embodiments. Simulations show a strong relationship between distance error and signal bandwidth in a multi-path environment consisting of two equal powered paths.

The MP algorithm requires that the channel response be continuous in the frequency domain, with equal frequency steps between channel estimation values. To fully use the channel information in an 802.11 and/or OFDM system, the missing subcarriers can be estimated using an interpolation algorithm.

Band-stitching with super-resolution techniques is addressed in academic literature [Sathyan, 2011]. The key challenge is to measure TOAs to an accuracy of the order of one nanosecond or better using low-cost hardware in difficult radio environments. Part of this challenge is the time and frequency difference between the local clocks in different nodes making the TOA measurements. The PhasorLab HSN is an excellent solution enabling the use of normal Wi-Fi devices to achieve highly accurate distance and positioning estimation.

Experimental Results

HSN was configured to transmit a series of reference symbols at six different frequencies separated by 11.25 MHz between two nodes with a line-of-sight signal path in an indoor office space, separated by 1 to 11 meters in 1-meter increments. The bandwidth of each transmission was approximately 32 MHz. The performance of MP combined with band-stitching for various configurations was compared with a correlation-based approach (labelled RTTM or round trip time). The band-stitching method with greatest bandwidth outperformed the narrower methods and RTTM for both patch antennas, which mitigate multi-path through their more focused transmissions and dipole antennas, having a much wider radiation pattern. The one-meter location was used to calibrate for the board and antenna delays. Additional variable delays due to the gain used in the receiver chain were accounted for using a set of predetermined calibration coefficients. Both patch antennas and dipole antennas were used with successful results.

During experimentation, one of the approaches investigated was calibrating the equipment against a channel that is assumed flat, in either a cabled connection or short-range transmission. This was not found to give any significant improvements on the quality of the distance estimations on the band-stitched data.

Where reference signals are described herein, it is understood that although any arbitrary signal could be used as reference signals, for practical purposes the radio signals that are considered for general purpose use, for example Wi-Fi or cellular signals, have certain beacon or reference signals, such as a sounding reference signal (SRS) in 4G LTE or 5G, that can be leveraged for the present disclosure. Notably, SRS is distinct in that it specifies the resource blocks that will be used by each uplink user. The identification of a particular user thus enables characterization of a channel (channel estimation) for that user, and finding the location of that user, according to this disclosure. As well, 5G SRS is designed to be flexibly configured to be suitable for a wide variety of bands and RF usage scenarios and is therefore well-suited to be used with this disclosure as well.

When reference signals that are part of existing standards are being interpreted, it is understood that an RF circuit may use one signal path for a cellular or Wi-Fi PHY network layer, and another signal path to perform the steps described herein, in some embodiments; or, in some embodiments, information from the cellular or Wi-Fi PHY may be passed to other circuits to perform the steps described herein; or, in some embodiments, a special mode may be used wherein location estimation is made possible by not transmitting regular data over the air interface. In some embodiments operations may take place at a PHY layer, or, at a MAC layer, or a combination thereof. In some embodiments, scheduling transmissions, scheduling a reference signal, or sending a frequency hopping signal may be performed at a PHY layer.

MP Overview

The matrix pencil (MP) algorithm is a super-resolution algorithm and can be used to determine the time of arrival of the first path in a multipath environment. A wireless channel response can be represented in the frequency domain as:

$$H(j2\pi k\Delta f) = \sum_{m=1}^{M} \alpha_m e^{-j2k\Delta f \tau_m} + n_m = \sum_{m=1}^{M} \alpha_m z_m^k + n_m; z_m = e^{-j2k\Delta f \tau_m}$$

where $\tau m$, $m=1, 2 \ldots, M$ represent the delays of the multipath channels and k the discrete Fourier transform index.

The Matrix Pencil method directly estimates channel delays. It is found that found that the delays are proportional to eigenvalues of the matrices formed from the channel response H.

Figure 6:
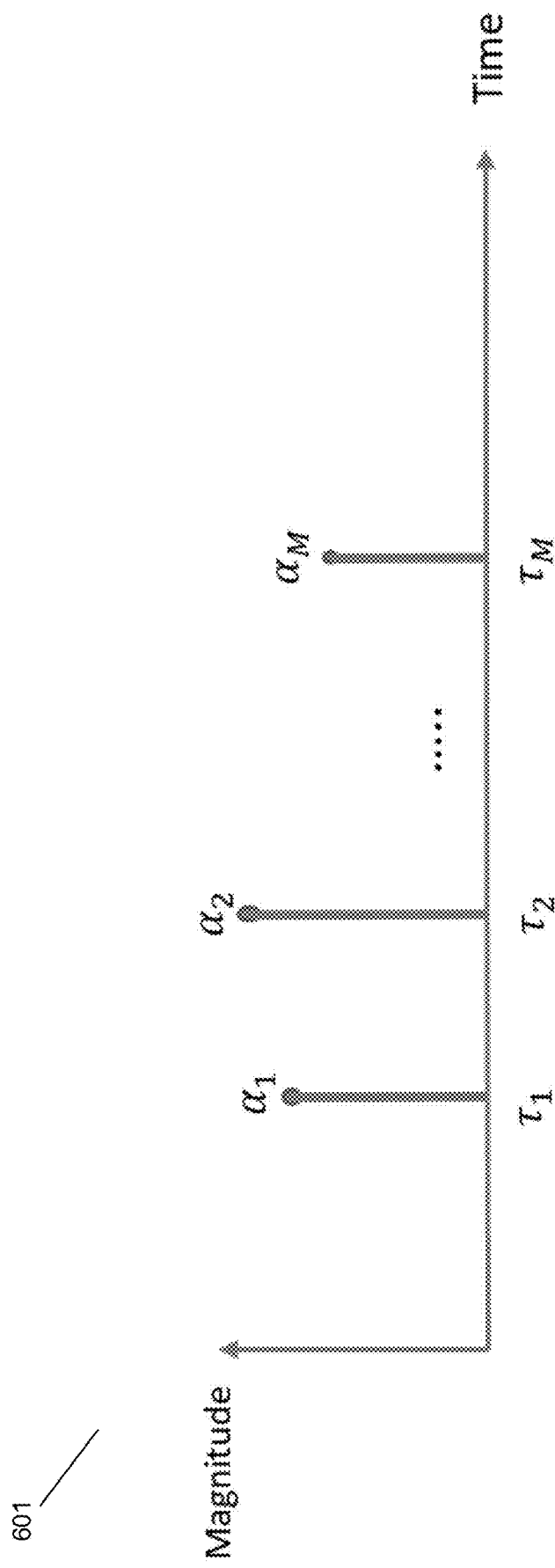
FIG. 6 is a schematic plot of magnitude versus time showing time domain representation of multi-path components, in accordance with some embodiments.

FIG. 6 is a schematic plot of magnitude versus time showing time domain representation of multi-path components for a synthesized channel estimate, in accordance with some embodiments. 601 is a time domain representation of multi-path components at delays of $\tau 1, \tau 2 \ldots, \tau M$ with amplitudes of $\alpha 1, \alpha 2 \ldots, \alpha M$ respectively.

Figure 7:
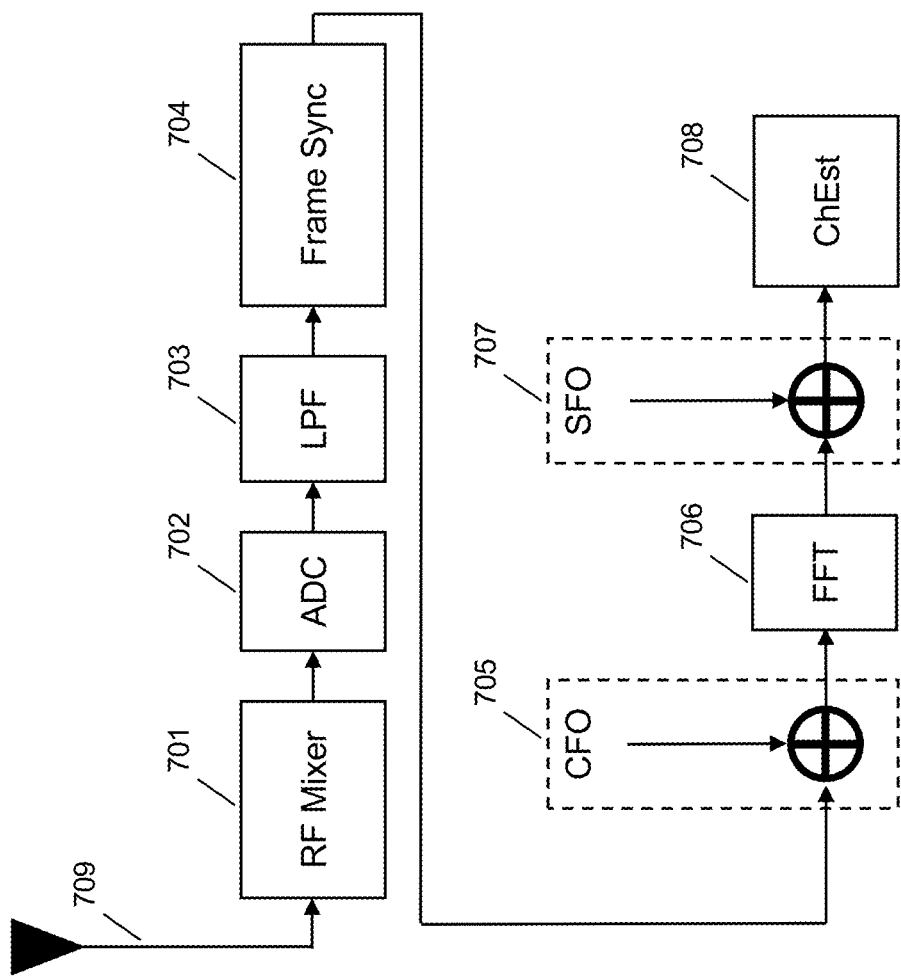
FIG. 7 is a schematic block diagram of an OFDM receiver showing offset correction, in accordance with some embodiments.

FIG. 7 shows carrier frequency offset (CFO) correction in time and sampling frequency offset (SFO) correction in frequency for a cellular uplink system, in accordance with some embodiments. RF mixer 701 receives signal samples from an antenna 709 in the time domain; ADC 702 digitizes those samples; low pass filter 703 is used to identify frames specific to an individual user; frame sync 704 determines the beginning of the LTE frame. Next, a CFO correction module 705, including at least an input carrying a CFO correction signal and a mixer, is used to apply CFO correction in the time domain. Next, an FFT 706 is performed to transform the signal to the frequency domain. Next, an SFO correction module 707, including at least an input carrying an SFO correction signal and a mixer, is used to apply SFO correction in the frequency domain. At module 708, channel estimation and further steps may be performed according to the method described herein (see FIG. 1 at 107, 108, 109, 110, 111 etc.); as well, the output of the offset-corrected signal can be passed to a demodulator (not shown). The present disclosure can be implemented on an LTE uplink transceiver as shown, or in another radio architecture.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The words "synthetic" and "synthesized" are used synonymously herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for positioning using synthesized wideband channel estimation, comprising:
    capturing, at at least one receiver node, a first received signal of a reference signal from a transmitter at a first carrier frequency;
    performing a reconfiguration to enable signal reception at a second carrier frequency;
    capturing a second received signal of the reference signal from the transmitter at the second carrier frequency;
    continuing to capture subsequent received signals until a plurality of frequencies in a synthetic wideband channel are sufficiently represented in a set of received signals;
    calculating segment channel estimates by performing channel estimation on each of the set of received signals;
    aligning overlapping sections of the calculated segment channel estimates to form a combined channel estimate of the synthetic wideband channel;
    deriving a shortest path delay value from a plurality of delays based on the combined channel estimate;
    deriving a time of arrival for the first received signal from the shortest path delay value; and
    estimating a position of the transmitter using the derived time of arrival,
    thereby using a channel estimate of a synthesized wideband channel to estimate the position of the transmitter.

2. The method of claim 1, wherein the reference signal is an arbitrary signal.

3. The method of claim 1, wherein the reference signal is one of a Long Term Evolution (LTE) or 5G sounding reference signal (SRS).

4. The method of claim 1, further comprising distributing a uplink schedule to at least one receiver node.

5. The method of claim 1, further comprising distributing a synchronized channel hopping sequence to a plurality of synchronized receivers; and, capturing a plurality of signals according to the synchronized channel hopping sequence.

6. The method of claim 1, further comprising: capturing the reference signal at a plurality of synchronized receiver nodes; and, estimating the position of the transmitter at each of the plurality of synchronized receiver nodes.

7. The method of claim 1, further comprising estimating the position of the transmitter at each of a plurality of synchronized receiver nodes; and, using the estimated position from the plurality of synchronized receiver nodes to increase positional accuracy.

8. The method of claim 1, further comprising removing at least one of carrier frequency offset and sampling frequency offset from a received reference signal at the at least one receiver node.

9. The method of claim 1, further comprising calculating the channel estimate with a frequency domain signal.

10. The method of claim 1, further comprising aligning overlapping sections subsequent to a transform from time domain into frequency domain.

11. The method of claim 1, further comprising aligning overlapping sections of the calculated channel estimates by adding or subtracting a phase from each channel estimate of the calculated channel estimates, thereby forming a continuous channel response when combined.

12. The method of claim 1, further comprising interpolating gaps in the calculated channel estimates.

13. The method of claim 1, wherein deriving a plurality of delays is performed using a matrix pencil algorithm.

14. The method of claim 1, wherein the combined channel estimate is continuous in phase.

15. A method of positioning using a shortest path based on a synthesized wideband channel estimate, comprising:
    continuously capturing a reference signal across a plurality of carrier frequencies until frequency coverage for the synthetic wide band is achieved;
    removing frequency offset for each of the plurality of carrier frequency captures;
    calculating a plurality of channel estimates for the plurality of carrier frequency captures;
    aligning the plurality of channel estimates;
    combining the plurality of channel estimates to construct a single channel estimate of the synthetic wide band;
    deriving a shortest delay for the received reference signal using the single channel estimate of the synthetic wide band; and
    using the derived shortest delay to estimate a time of arrival and thereby determine an estimated location.

16. The method of claim 15, further comprising distributing an uplink schedule to a plurality of synchronized nodes.

17. The method of claim 15, wherein continuously capturing the reference signal comprises repeatedly capturing the reference signal.

* * * * *